United States Patent [19]

Johnson et al.

[11] 4,068,156
[45] Jan. 10, 1978

[54] RATE CONTROL SYSTEM FOR MANIPULATOR ARMS

[75] Inventors: Charles H. Johnson, Honolulu, Hawaii; Robert A. Booker, Evergreen, Colo.

[73] Assignee: Martin Marietta Corporation, Rockville, Md.

[21] Appl. No.: 773,368

[22] Filed: Mar. 1, 1977

[51] Int. Cl.² ............................................... B25J 01/02
[52] U.S. Cl. ..................................... 318/575; 364/478
[58] Field of Search .................. 235/151.11; 318/567, 318/568, 575; 214/1 CM

[56] References Cited

PUBLICATIONS

"The Mathematics of Coordinated Control of Prosthetic Arms and Manipulators" by Whitney in Transactions of the ASME Journal of Dynamic Systems, Measurement and Control, 1972, pp. 1-7.

"Resolved Motion Rate Control of Manipulators and Human Prostheses" Published as part of the IEEE Transactions on Man Machine Systems, vol. MMS-10 No. 2, June 1969, pp. 47-53.

*Primary Examiner*—Eugene G. Botz
*Attorney, Agent, or Firm*—Sughrue, Rothwell, Mion, Zinn and Macpeak

[57] ABSTRACT

A manipulator system having a master control console and a slave mainpulator arm controlled by signals from the master control console is disclosed. The master control console includes a translation controller and a rotation controller, and the slave manipulator arm includes pivoted arm segments moved by translational servos in response to signals generated by the translation controller and pivoted wrist units moved by rotational servos in response to signals generated by the rotation controller. The slave manipulator arm has six degrees freedom of movement defined as three translational degrees of freedom in range, azimuth and elevation and three rotational degrees of freedom in wrist pitch, yaw and roll. The signals generated by each of the translation controller and the rotation controller are rate command signals. The translational servos compare commanded range, azimuth, elevation or attitude rate with the actual range, azimuth, elevation or attitude rates of the slave manipulator arm. Attitude rate error signals are generated and related to manipulator applied forces. Similarly, the rotational servos compare commanded wrist pitch, yaw and roll rates with actual wrist pitch, yaw roll rates of the slave manipulator arm. Wrist rate error signals are generated and related to manipulator applied torques. Thus, when in contact with an object, no forces or moments are produced unless the rate controllers are deflected and held, the magnitude of the applied forces and moments being proportional to controller displacement. The computed forces fromthe translational servos and the computed torques from the rotational servos are displayed on the master control console to provide visual force and torque feedback to the operator.

7 Claims, 9 Drawing Figures

RATE CONTROL SYSTEM FOR MANIPULATOR ARMS

BACKGROUND OF THE INVENTION

The present invention generally relates to master-slave manipulator arm systems, and more particularly to a new rate control system for such master-slave manipulator arms which presents force and moment information to the operator.

In general, manipulator systems are complex servo systems and incorporate humans in the feed-back and command segments of the loop. Such systems are used in environments which are unsafe for the presence of the human operator. For example, manipulator systems have been used in such diverse areas as underwater systems, systems exposed to high nuclear radiation and extra terrestrial systems. In the manipulator system, the human operator element is by far the least predictable element in the servo loop, and a design which minimizes the performance sensitivities to the human operator element variations is the desirable servo configuration.

Most maniptulator arm control systems presently used in industry are the bilateral position mode type and are used for dexterous manipultive tasks requiring force reflection. In one type of bilateral position mode control system, input rate commands are integrated and compared with arm position values. Integrators are incorporated into the system, and gimbal data is secured from the arm in the form of joint angular positions. A characteristic of this system is that forces and torques applied to or by the arm can be held after the controllers have been returned to null. This means that a force build-up in a direction not desired must be nulled by controller commands. If the applied forces and moments are displayed to the operator, the operator can readily and quite accurately null these unwanted forces. To accomplish the manipulative task with this type of system, the operator builds up forces in the direction required while at the same time nulling forces in the other directions. This continued nulling procedure consumes a large portion of the total manipulative task time and therefore greatly contributes to operator fatigue.

Another problem with the bilateral position mode type control system is the tendency to build up error signals which can be come larger than the level corresponding to the maximum force capability of the arm. When this occurs, it is necessary to apply a command to reduce the error signal to where a force change can be detected. During this time, however, the operator had no indication of exactly what is happening, and it becomes relatively easy to loose control of the arm by not knowing immediately what to do to regain control. This problem can be avoided by introducing logic into the control equations such that the error signal could not continue to build up after it reached a maximum level. This solution increases the complexity of the manipulator control system without producing any substantial improvement in the tip precision in the manipulator arm.

SUMMARY OF THE INVENTION

It is therefore an object of this invention to provide a manipulator control system which is basically simpler and less costly to implement than bilateral position mode type control systems, but has far more precision and flexibility than the bilateral position mode type control system.

It is another object of the invention to provide a manipulator control system wherein the mental and physical fatigue of the human operator are greatly reduced thereby increasing the performance of the overall system.

These and other objects are attained by providing a rate control system which incorporates a technique of visually displaying the forces and moments applied to or by the arm in the accomplishment of any task. The implementation of this technique does not require the use of any type of force sensors to obtain the displayed data. The control system according to the invention is a true rate system in that for a free moving arm, arm tip velocities are proportional to the deflection of the rate hand controllers. The same implementation, however, also allows commanding forces and moments at the arm tip, proportional to controller deflection, for the static situation such as working at task panels. Force and moment values in six degrees of freedom of movement are independently calculated in the translational and rotational servos from input rate commands and actual gimbal rates. These force and moment values are displayed to the operator at the same time that the corresponding forces and moments are being applied through the arm to a task panel. Among the several advantages of the rate control system according to the present invention as compared with the bilateral position mode type control system is that the motion of the arm is much smoother since motion coupling between translational and rotational motion is much less with the rate system. Not only is operator mental and physical fatigue much less with the rate system, an added advantage is that the operator training times are much less for the rate system. Furthermore, the rate control system can be used with any coordinate reference frame and permits easy implementation of desirable control features which require conversion from one coordinate reference frame to another.

A characteristic of the rate control system according to the invention is that for a fixed task panel, forces and moments applied to or by the arm can be held only by maintaining a controller deflection. In other words, when translation and rotation controller deflections are nulled in a "hands-off" operation, all forces and moments on the arm are quickly and automatically nulled. This characteristic is very desirable since it is not necessary to actively null forces or moments in unwanted directions. By controlling the rate loop gains, the time required to automatically null unwanted forces can be made variable.

BRIEF DESCRIPTION OF THE DRAWINGS

The foregoing and other objects, advantages, aspects and uses of the invention will be better understood from the following detailed description with reference to the drawings, in which.

DESCRIPTION OF THE PREFERRED EMBODIMENT

Figure 1:
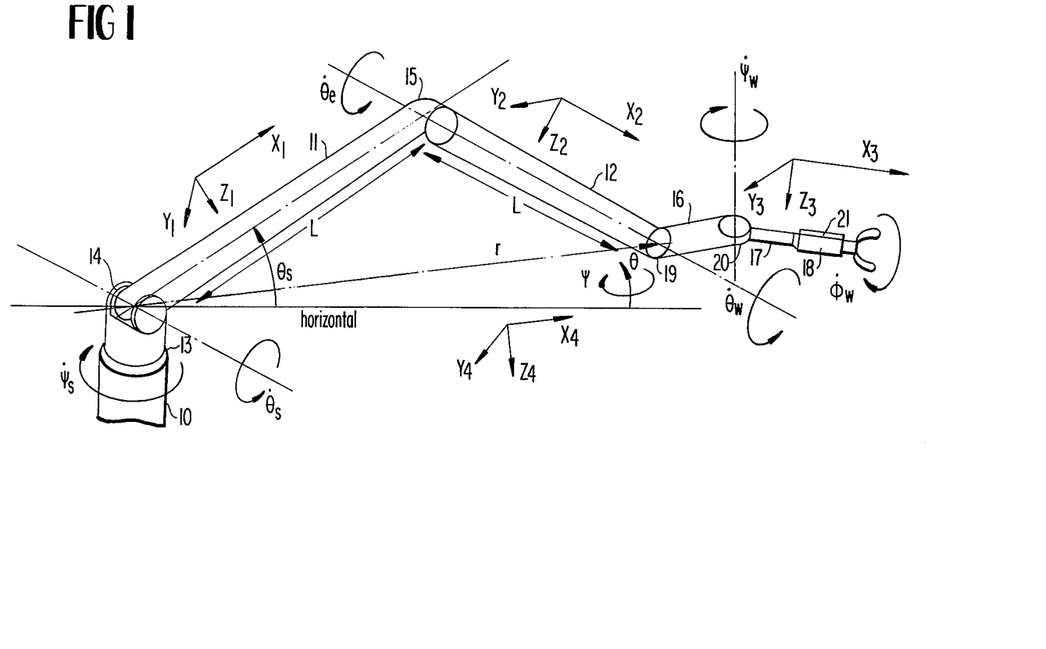
FIG. 1 is a perspective illustration of the slave manipulator arm showing the six degrees of freedom of movement of the arm.

FIG. 1 illustrates the basic configuration of the manipulator arm which comprises a base 10 and pivoted arm segments 11 and 12. The arm segment 11 is joined to the base 10 through a shoulder joint comprising a yaw gimbal 13 and a pitch gimbal 14. The arm segments 11 and 12 are connected by an elbow joint comprising an elbow pitch gimbal 15. Translational motion of the manipulator arm is provided by the combined rotations of the gimbals 13, 14, and 15. The coordinate system used to define the translational movement of the manipulator arm may be cartesian, cylindrical or spherical. Because of the nature of the motions involved in the gimbals 13, 14 and 15, the spherical coordinate system comprising range, azimuth and elevation is conveniently used. As illustrated in FIG. 1, the corresponding motion vectors are the range vector $r$, the yaw vector $\psi$ and the elevation vector $\theta$. The position of gimbal 13 is defined as shoulder yaw $\psi_s$, the position of the gimbal 14 is defined as shoulder pitch $\theta_s$, and the position of gimbal 15 is defined as elbow pitch $\theta_e$. The spherical vectors range $r$, azimuth $\psi$ and elevation $\theta$ are related to the gimbal positions by the following equations:

$r = 2L\cos\gamma$, where $\gamma = \theta_e/2$ $\theta\ \theta_s + \gamma$ $\psi = \psi_s$ where L equals arm seqment lengths.

Rotational motion of the tip end of the manipulator arm is provided by three pivoted wrist units 16, 17 and 18. The wrist unit 16 is connected to the end of the arm segment 12 by means of a gimbal 19. The wrist units 16 and 17 are joined by a gimbal 20 the wrist unit 18 is attached to wrist unit 17 through a gimbal 21. The axes of rotation of the gimbals 19, 20 and 21 are each mutually perpendicular. The position of gimbal 19 is defined as wrist pitch $\theta_w$, and position of gimbal 20 is defined as wrist yaw $\psi_w$, and the position of gimbal 21 is defined as wrist roll $\phi_w$.

Thus, the manipulator arm illustrated in FIG. 1 has six degrees of freedom of movement, three of which are translational and three of which are rotational. In order to provide rotation in each of the gimbals, separate torque motors are provided. Since the control system according to the invention is a rate control system, each gimbal is also provided with a rate sensor such as a tachometer. Also as will become clear from the development of the servo equations, position sensors such as potentiometers are required at certain of the gimbals. Specifically, position sensors are required at gimbals 14, 15, 19 and 20.

The six degrees of freedom of motion problem of the manipulator arm are divided into two three degrees of freedom of motion problems. Translational control of the wrist point is provided by range, azimuth and elevation rate commands originating from the translation controller operated by the human operator. Rotational control of the wrist assembly is provided by pitch, yaw and roll rate commands originating from the rotation controller operated by the human operator.

Figure 2:
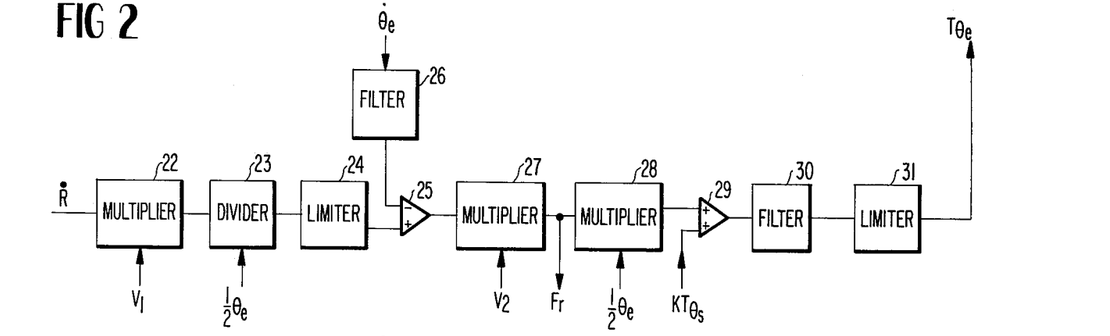
FIG. 2 is a block diagram of the elbow pitch servo.

Referring now to FIG. 2, the range servo implements the following equation:

$$-K_2 L \sin\gamma (-\frac{K_1 \dot{R}}{L\sin\gamma} - \dot{\theta}_e) = T_{\theta_e}$$

where $K_1$ = an operator variable gain which determines the translational controller sensitivity, $K_2$ = an operator variable gain which determines the translational motions servo stiffness, L = the length of segments 11 or 12, and $T_{\theta_e}$ = the torque applied to the gimbal 15. It will be recalled that the range vector $r$ is a function of the cosine of $\gamma$, where $\gamma = \theta_e/2$, and therefore the range rate $\dot{R}$ is a function of both sine $\gamma$ and $\dot{\theta}_e$. Thus, both rate and position sensors are required at the gimbal 15. Because of the mass and hence the inertia associated with the manipulator arm the range rate is also affected by rotation about the gimbal 14. Therefore, a factor proportional to the torque applied to the gimbal 14 $T\theta_s$ must be added to the servo equation as follows:

$$-K_2 L\sin\gamma (-\frac{K_1 \dot{R}}{L\sin\gamma} - \dot{\theta}_e) + KT_{\theta_s} = T_{\theta_e}$$

where the constant K is determined by both system and environmental parameters. For example, if the manipulator arm were used in an underwater situation, both the mass of the arm and the buoyancy of the arm are factors to be considered in defining the constant K. This constant, unlike the variable gains $K_1$ and $K_2$, is not operator variable.

In FIG. 2, the range rate command $\dot{R}$ is applied to one input of a multiplier 22. The multiplier 22 is conveniently a voltage variable gain amplifier having a gain $K_1$ proportional to an input control voltage $V_1$. The input control voltage $V_1$ is operator variable. The output of the multiplier 22 which is proportional to $K_1\dot{R}$ is applied to the input of a divider 23. The divider 23 divides $K_1\dot{R}$ by $-L\sin\gamma$. Since $\gamma$ is equal to $\frac{1}{2}\theta_e$, the other input to the divider 23 is $\frac{1}{2}\theta_e$ derived from the position sensor at gimbal 15. The output of the divider 23 is a derived gimbal rate command which is applied through the limiter 24 to the positive input of a differential amplifier 25. The purpose of the limiter 24 is to control the magnitude of the derived gimbal rate command and thus prevent the rate for, in this case, the elbow joint from exceeding designed values as the manipulator arm is extended to the extremes of its operating volume. The differential amplifier 25 operates as the comparing or summing junction of the servo and receives the actual gimbal rate $\dot{\theta}_e$ of the gimbal 15 from filter 26 at its negative input. The filter 26 is a tachometer ripple filter which provides a smooth d.c. signal to the negative input of the differential amplifier 25.

The output of the differential amplifier 25 is the error signal from which the torquie drive signal to the torque motor at the gimbal 15 is derived. This error signal is applied to the multiplier 27 which multiplies the error signal by the variable gain $K_2$. This variable gain is controlled by the input control voltage $V_2$ which is operator variable. The output of multiplier 27 is a signal proportional to the range translational force $F_r$, which is used to provide a display to the operator on the master control console as will be described in more detail hereinafter. The output of multiplier 27 is also connected to one input of multiplier 28 which multiplies the computed foresignal by -Lsin$\gamma$ to produce an output proportional to the moment. The other input to the multiplier 28 is equal to $\frac{1}{2} \theta_e$ and is, again, derived from the position sensor at the gimbal 15. The moment output from the multiplier 28 is summed in summing amplifier 29 with a signal proportional to the factor KT$_{\theta s}$ which is related to the torque applied to the gimbal 14. The output signal from the summing amplifier 29 is applied via the compensation network 30 and the limiter 31 to the torque motor at gimbal 15. The limiter 31 is provided to control the torque commands derived from large error signals.

Figure 3:
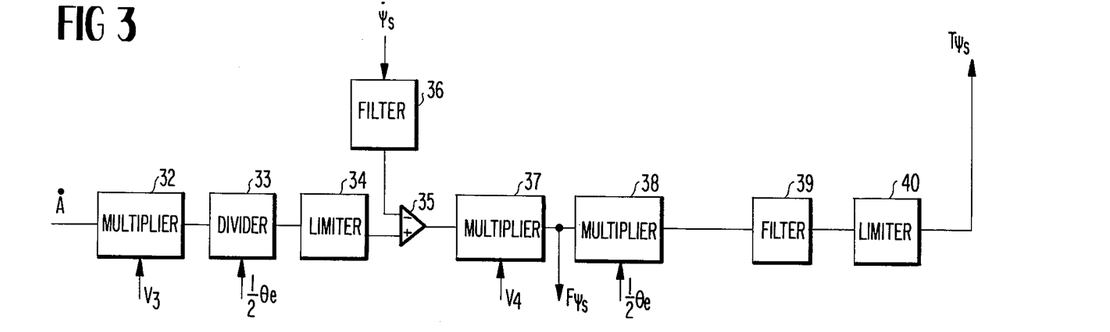
FIG. 3 is a block diagram of the shoulder yaw servo.

Turning now to FIG. 3, the azimuth rate servo implements the following:

$$2K_4 L\cos\gamma \left( \frac{K_3 \dot{A}}{2L\cos\gamma} - \dot{\psi}_s \right) = T_{\psi s}$$

where $K_3$ and $K_4$ = operator variable gain which determine translational controller sensitivity and translational motion servo stiffness, respectively, and $T_{\psi s}$ = the torque signal applied to the torque motor for the gimbal 13. It will be appreciated from the azimuth rate servo equation that azimuth rate A is a function of both shoulder yaw rate $\dot{\psi}_s$ and $\gamma$. Therefore, the azimuth rate servo requires inputs from both the shoulder yaw rate sensor at gimbal 13 and the elbow position sensor at gimbal 15.

With reference to FIG. 3, the azimuth rate command signal $\dot{A}$ from the master control console is applied to one input of multiplier 32. Multiplier 32 may again be a variable gain amplifier having a gain $K_3$ controlled by a control voltage $V_3$ which is operator variable. The output of multiplier 32 $K_3\dot{A}$ is applied to one input of divider 33. Divider 33 divides the product $K_3\dot{A}$ by 2Lsin$\gamma$; therefore, the other input to the divider 33 is $\frac{1}{2} \theta_e$ which is derived from the position sensor at gimbal 15. The output of divider 33 is applied through limiter 34 to the positive input of the differential amplifier 35. Limiter 34 has the same function as limiter 24 in FIG. 2. The differential amplifier 35 functions as the summing junction of the servo and receives as its negative input the shoulder yaw rate $\dot{\psi}_s$ from the tachometer at the gimbal 13 through the filter 36. The error signal at the output of the differential amplifier 35 is multiplied in multiplier 37 by the variable gain $K_4$ which is controlled by the operator variable control voltage $V_4$. The output of multiplier 37 is the derived yaw force $F_{\psi s}$. This force is also displayed on the master control console. The output of multiplier 37 is connected to one input of multiplier 38 which multiplies the yaw force $F_{\psi s}$ by 2Lsin$\gamma$ to develop a moment output signal. This moment output signal is applied through compensation network 39 and limiter 40 to the torque motor at gimbal 13. The purpose of limiter 40 is the same as limiter 31 in FIG. 2.

Figure 4:
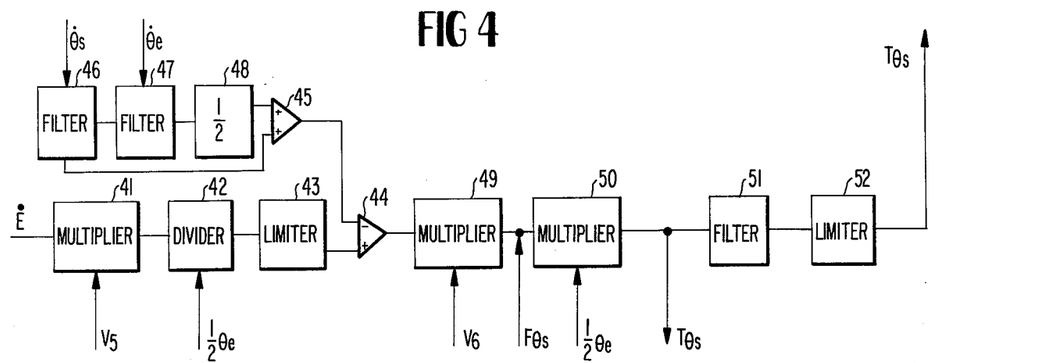
FIG. 4 is a block diagram of the shoulder pitch servo.

Referring now to FIG. 4, the elevation rate servo implements the following equation:

$$2K_6 L\cos\gamma \left( \frac{K_5 \dot{E}}{2L\cos\gamma} - \frac{1}{2} \dot{\theta}_e - \dot{\theta}_s \right) = T_{\theta s}$$

where $K_5$ and $K_6$ = variable gains which determine translational controller sensitivity and translational motion servo stiffness, respectively, and $T_{\theta s}$ = the signal applied to the torque motor at gimbal 14. As will be appreciated from the elevation rate servo equation, the elevation rate $\dot{E}$ is a function of elbow pitch position, elbow pitch rate and shoulder pitch rate. Therefore, the elevation rate servo must receive as inputs the output of the elbow position sensor and the elbow pitch rate sensor at gimbal 15 and the shoulder pitch rate sensor at gimbal 14.

In FIG. 4, the elevation rate command $\dot{E}$ is applied to one input of multiplier 41 which multiplies the elevation rate command by a variable gain $K_5$ which is controlled by the operator variable control voltage $V_5$. The output of multiplier 41 $K_5\dot{E}$ is applied to one input of divider 42. Divider 42 divides the product $K_5\dot{E}$ by 2Lcos$\gamma$. The other input to the divider 42 is therefore $\frac{1}{2} \theta_e$ derived from the position sensor at gimbal 15. The derived elevation command signal from divider 42 is applied by way of limiter 43 to the positive input of differential amplifier 44. The negative input to the differential amplifier 44 is supplied by the output of summing amplifier 45. The inputs summing amplifier 45 are derived from the elbow pitch rate sensor at gimbal 15 and the shoulder pitch rate sensor at gimbal 14. More specifically, the shoulder pitch rate $\dot{\theta}_s$ is applied by means of tachometer ripple filter 46 directly to one input of the summing amplifier 45. The elbow pitch rate $\dot{\theta}_e$ is applied by means of tachometer ripple filter 47 and attenuator 48 to the other input of the summing amplifier 45. The attenuation factor of the attenuator 48 is equal to $\frac{1}{2}$.

The differential amplifier 44 has the function of the summing junction of the elevation rate servo and produces an error signal at its output. This error signal is applied to one input of multiplier 49 which multiplies the error signal by the variable gain $K_6$ which is controlled by the operator variable control voltage $V_6$. The output of multiplier 49 is the derived shoulder pitch force $F_{\theta s}$ which is displayed on the master control console. The output of multiplier 49 is also connected to one input of multiplier 50 which multiplies the should pitch force $F_{\theta s}$ by 2Lcos$\gamma$ to derive a moment signal. This moment signal is applied by means of compensation network 51 and limiter 52 to the torque motor at gimbal 14.

Figure 5:
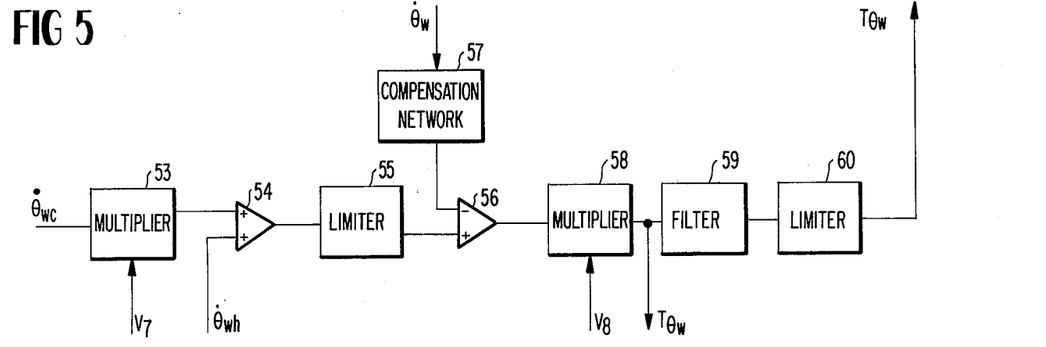
FIG. 5 is a block diagram of the wrist pitch servo.
Figure 6:
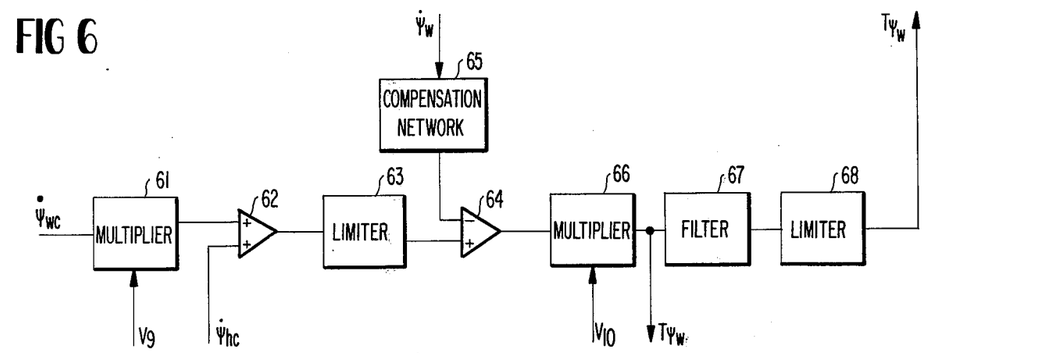
FIG. 6 is a block diagram of the wrist yaw servo.
Figure 7:
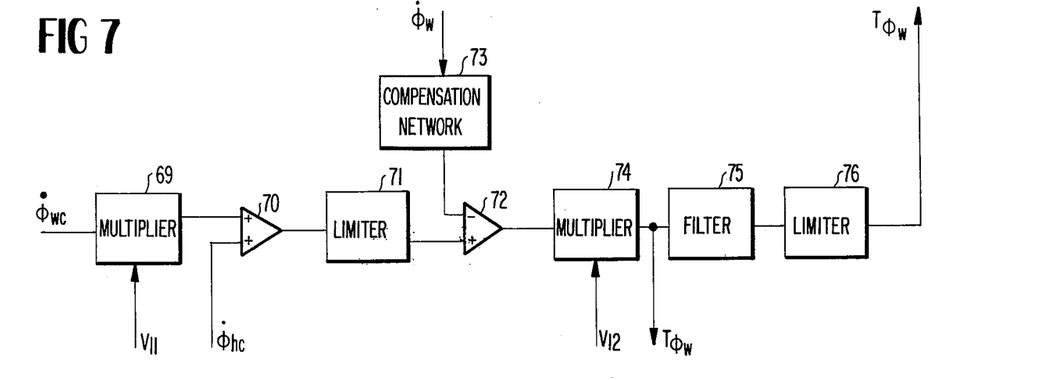
FIG. 7 is a block diagram of the wrist roll servo.

Unlike the translational servo equations, the rotational servo equations have identically the same form. More specifically, referring to FIGS. 5, 6 and 7, the wrist pitch, yaw and roll rate servo equations are as follows:

$$K_8(K_7\dot{\theta}_{wc} - \dot{\theta}_w) = T_{\theta w}$$

$$K_{10}(K_9\dot{\psi}_{wc} - \dot{\psi}_w) = T_{-w}$$

$$K_{12}(K_{11}\dot{\theta}_{wc} - \dot{\theta}_w) = T_{\theta w}$$

where $K_7$, $K_9$ and $K_{11}$ = variable gains which determine rotational controller sensitivity, $K_8$, $K_{10}$ and $K_{12}$ are variable gains which determine the rotational motion servo stiffness, and $T_{\theta w}$, $T_{\phi w}$ and $T_{\phi w}$ = the torque signals applied to the torque motors at gimbals 19, 20 and 21, respectively. As will be described in more detail hereinafter, it is a relatively simple matter to translate from one coordinate system to another to facilitate task requirements. For example, it was "natural" to select spherical coordinates to describe the translational motion of the free flying manipulator arm. However, once the tip end of the manipulator arm has reached its desired destination, often the movements of the terminal device attached to the tip end of the manipulaotr arm are best controlled in cartesian coordinates. One feature of the invention which is described in more detail hereinafter is a "hawk" mode wherein all three wrist gimbals 19, 20 and 21 are driven to prevent a change in the attitude of the terminal device as a result of range, azimuth or elevation translational motion. This is accomplished by deriving "hawk" command signals for wrist pitch rate $\dot{\theta}_{wh}$, wrist yar rate $\dot{\theta}_{wh}$ and wrist roll rate $\dot{\theta}_{wh}$. These "hawk" command signals are applied to the rotational servo systems according to the following equations:

$$K_8(K_7\dot{\theta}_{wc}+\dot{\theta}_{wh}=\dot{\theta}_w) = T_{\theta w}$$

$$K_{10}(K_9\dot{\psi}_{wc}+\dot{\psi}_{wh}-\dot{\psi}_w) = T_{\psi w}$$

$$K_{12}(K_{11}\dot{\phi}_{wc}+\dot{\phi}_{wh}-\dot{\phi}_w) = T_{\phi w}$$

Referring now to FIG. 5, the wrist pitch rate command signal $\theta_{wc}$ from the rotation controller operated by the human operator is applied as one input to the multiplier 53 which multiplies this command signal by the variable gain $K_t$ which is controlled by the operator variable control voltage $V_7$. The output of multiplier 53 is applied by way of summing amplifier 54 and limiter 55 to the positive input of differential amplifier 56. When the system is in the "hawk" mode, the hawk command signal $\dot{\theta}_{wh}$ is applied to the other input of the summing amplifier 54. The differential amplifier 56 is the summing junction for the wrist pitch rate servo and receives as its other input the output $\dot{\theta}_w$ from the tachometer at gimbal 19 through the tachometer ripple filter 57. The error signal output from the differential amplifier 56 is multiplied by the variable gain $K_8$ in multiplier 58 controlled by the output variable control voltage $V_8$. The output of multiplifer 58 is proportional to the wrist pitch torque $T_{\theta w}$, and this signal is both displayed on the master control console and applied by means of the servo compensation network 59 and the limiter 60 to the torque motor at gimbal 19. The limiters 55 and 60 serve analogous functions to the limiters 24 and 31, respectively, in FIG. 2.

FIG. 6 shows the wrist yaw rate servo wherein the wrist yaw rate command $\dot{\psi}_{wc}$ is applied as one input to multiplier 61. Multiplier 61 multiplies the wrist yaw rate command by a variable gain $K_9$ which is controlled by the operator variable control voltage $V_9$. The output of multiplier 61 is applied through summing amplifier 62 and limiter 63 to differential amplifier 64. Differential amplifier 64 is the summing junction of the wrist yaw rate servo and receives as its other input the wrist yaw rate $\dot{\psi}_w$ from the rate sensor at gimbal 20 through tachometer ripple filter 65. The error output signal from the differential amplifier 64 is multiplied in multiplier 66 by a variable gain $K_{10}$ controlled by the operator variable control voltage $V_{10}$. The output of multiplier 66 is proportional to the torque $T_{\psi w}$ applied at the gimbal 20. This signal is both displayed on the master control console and applied through the servo compensation network 67 and the limiter 68 to the torque motor at the gimbal 20.

The wrist roll rate servo shown in FIG. 7 follows the same construction as the wrist pitch rate and wrist yaw rate servos shown in FIGS. 5 and 6. More specifically, the wrist roll command $\dot{\phi}_{wc}$ is applied as one input to multiplier 69 which multiplies the command signal by the variable gain $K_{11}$ controlled by the control voltage $V_{11}$. The output of multiplier 69 is applied by way of summing amplifier 70 and limiter 71 to one input of the differential amplifier 72. The differential amplifier 72 is the summing junction of the wrist rate servo and receives as its other input the wrist roll rate $\dot{\phi}_w$ through the tachometer ripple filter 73. The error output signal from the differential amplifier 72 is multiplied in multiplier 74 by the variable gain $K_{12}$ controlled by the control voltage $V_{12}$. The output of the multiplier 74 is the derived wrist roll torque $T_{\phi w}$ and this signal is both displayed on the master control console and applied through the servo compensation network 75 and the limiter 76 to the torque motor at the gimbal 21.

Figure 8:
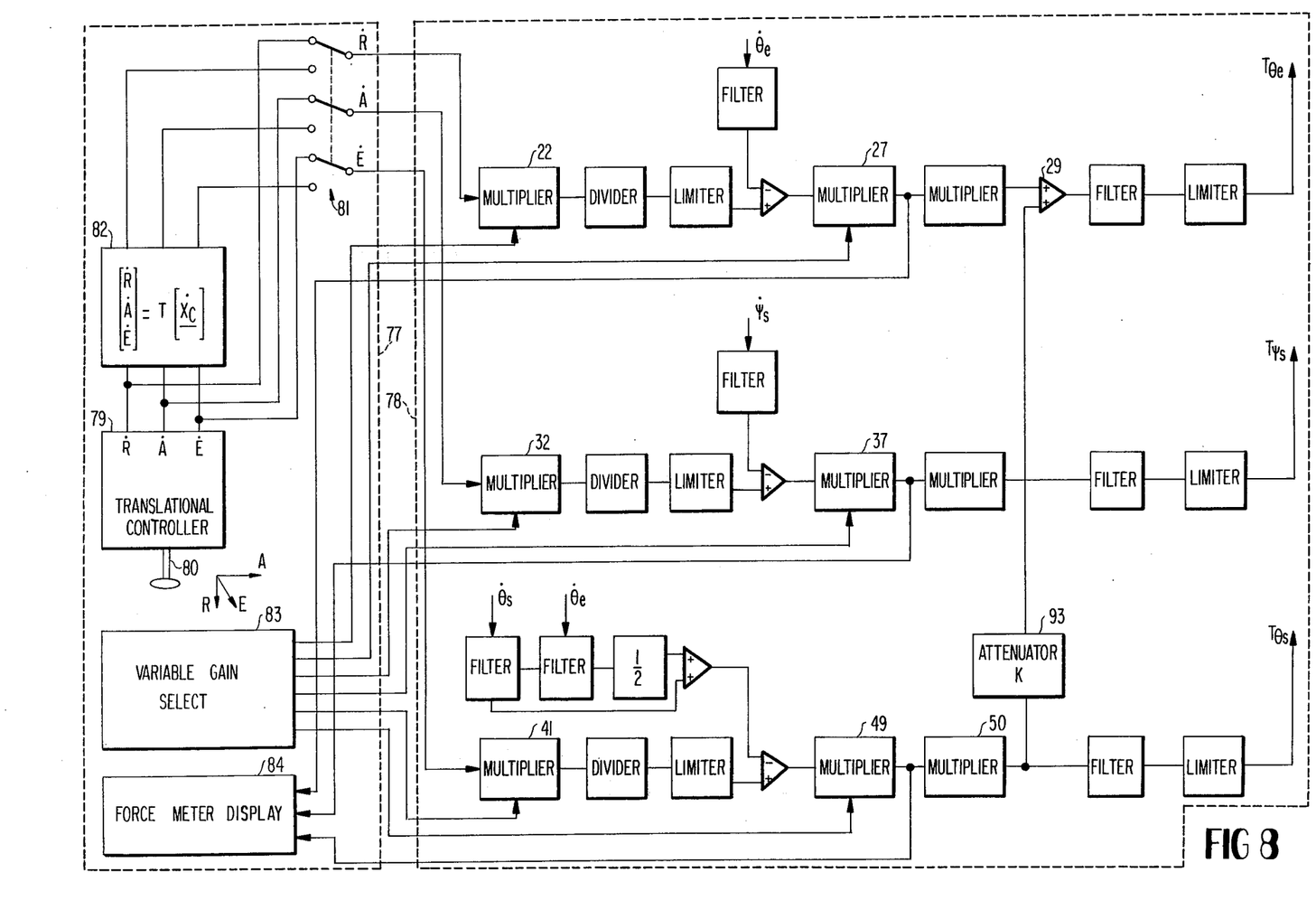
FIG. 8 is a block diagram of the complete translation servo system.

FIG. 8 shows the complete translation servo system and generally comprises an operator's console 77 and the three manipulator arm translation servos 78. The operator's console 77 comprises a translational controller 79 which is operated in three degrees of freedom by a "joy" stick 80. The output of the translational controller 79 are the range, azimuth and elevation rate command signals $\dot{R}$, $\dot{A}$ and $\dot{E}$. These are provided by means of the selector switch 81 to the inputs of each of the translation rate servos. The outputs of the translational controller 79 are also provided to the inputs of a translation T matrix which translates the spherical coordinate range, azimuth elevation rate command signals into cartesian coordinate rate signals. The selector switch 81 may be moved to its lower position by the operator to select cartesian coordinate rate command signals in place of the spherical coordinate rate command signals. The transformation T matrix equations are as follows:

$$\begin{bmatrix} \dot{R} \\ \dot{A} \\ \dot{E} \end{bmatrix} = D_{24}D_{32} \begin{bmatrix} \dot{x}_3 \\ \dot{y}_3 \\ \dot{z}_3 \end{bmatrix}$$

where $D_{ij}$ = Euler angle coordinate transformation from $i^{th}$ to $j^{th}$ coordinate system, and $x_3, y_c, z_3$ = system 3 body rate Cartesian coordinates.

Substituting the D transformations yields:

$$\begin{bmatrix} \dot{R} \\ \dot{A} \\ \dot{E} \end{bmatrix} =$$

$$\begin{bmatrix} \cos(\theta_w+\gamma)\cos\psi_w & -\cos(\theta_w+\gamma)\sin\psi_w & \sin(\theta_w+\gamma) \\ \sin\psi_w & \cos\psi_w & 0 \\ -\sin(\theta_w+\gamma)\cos\psi_w & \sin(\psi_w+\gamma)\sin\psi_w & \cos(\theta_w+\gamma) \end{bmatrix} \begin{bmatrix} \dot{x}_3 \\ \dot{y}_3 \\ \dot{z}_3 \end{bmatrix}$$

where $$\gamma = \frac{1}{2}\theta_e.$$

FIG. 1 illustrates the four system body rate cartesian coordinates. In the first cartesian coordinate system, the vector $x_1$ is parallel with the arm segment 11. In the second cartesian coordinate system, the vector $x_2$ is parallel with the arm segment 12. In the third cartesian coordinate system the vector $x_3$ is parallel with the axis of wrist segment 18. Finally, in the fourth cartesian coordinate system the $x_4$ vector is parallel with the range vector $r$. The output of the selector switch 81 are applied to the inputs of multipliers 22, 32 and 41, respectively.

The operator console 77 also includes a variable gain select panel 83, typically in the form of a panel of six potentiometers for establishing the control voltages $V_1$ to $V_6$. The outputs of this variable gain select panel 83 are provided by each of the multipliers 22, 27, 32, 37, 41 and 49. The operator's console also includes a force meter display 84 typically constituted by three galvanometer-type meters. These meters are each responsive to the outputs of multipliers 27, 37 and 49, respectively. Also as shown in FIG. 8, the input $KT_{\theta s}$ to amplifier 29 (see FIG. 2) is provided by attenuator 93 connected to the output of multiplier 50.

Figure 9:
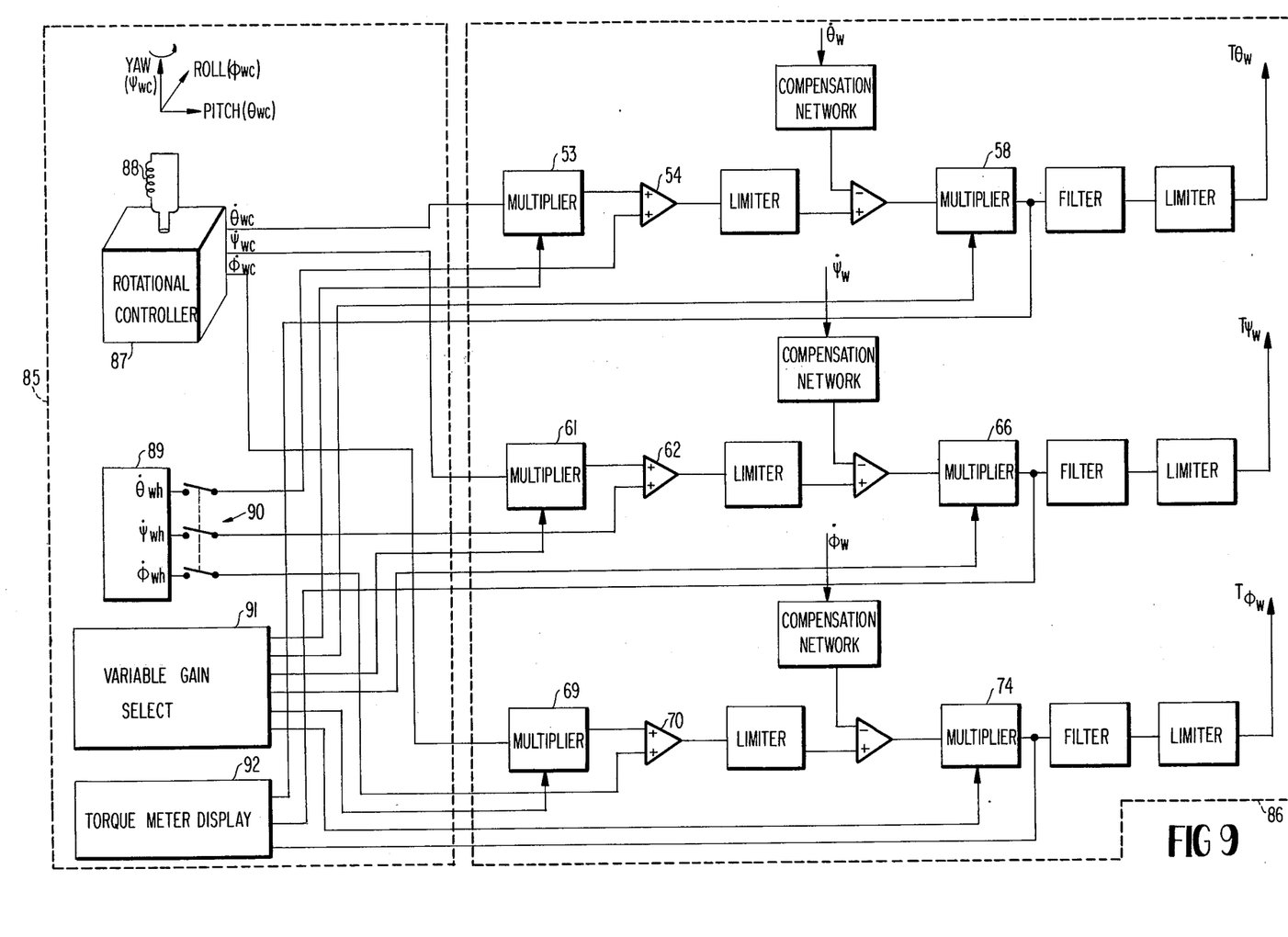
FIG. 9 is a block diagram of the complete rotation servo system.

FIG. 9 shows the complete rotation servo system and comprises an operator's console 85 and a rotation servo system 86. The operators console includes a rotational controller 87 which is operated by means of a three degree of freedom "joy" stick 88. The outputs of the rotational controller 87 are the wrist pitch, yaw and roll rate commands $\dot{\theta}_{wc}$, $\dot{\psi}_{wc}$ and $\dot{\phi}_{wc}$. These commands are connected to the inputs of multipliers 53, 61 and 69, respectively. The operator's console 85 also includes a "hawk" command matrix 89 with an operator selector switch 90. With selector switch 90 closed, the "hawk" command matrix 89 provides hawk command signals $\dot{\theta}_{wh}$, $\dot{\psi}_{wh}$ and $\dot{\phi}_{wh}$ to summing amplifiers 54, 62 and 70, respectively. The full "hawk" equations are as follows:

$$\begin{bmatrix} \dot{\phi}_{wh} \\ \dot{\theta}_{wh} \\ \dot{\psi}_{wh} \end{bmatrix} = \begin{bmatrix} -D_{e3}D_{23}\begin{bmatrix} 0 \\ \dot{\theta}_e \\ 0 \end{bmatrix} + D_{12}D_{el}^{-1}\begin{bmatrix} \dot{\theta}_s \\ \dot{\psi}_s \end{bmatrix} \end{bmatrix}$$

where $D_{ij}$ = Euler angle coordinate transformation from $i^{th}$ to $j^{th}$ coordinate system, $D_{el}^{-1}$ = Euler rate transformation from shoulder pitch and yaw gimbal rates to axis system 1 body rates, and $D_{e3}$ = Euler rate transformation from axis system 3 body rates to wrist gimbal rates. substituting the D transformations yields:

$$\dot{\phi}_{wh} = \frac{\dot{\psi}_s \sin(\theta_e + \theta_s + \theta_w)}{\cos \psi_w}$$

$$\dot{\theta}_{wh} = -\dot{\theta}_e - \dot{\theta}_s - \dot{\psi}_s \tan\psi_w \sin(\theta_e + \theta_s + \theta_w)$$

$$\dot{\psi}_{wh} = -\dot{\psi}_s \cos(\theta_e + \theta_s + \theta_w)$$

Like the operator's console 77, the operator's console 85 includes a variable gain select panel comprising six potentiometers to establish the control voltages $V_7$ to $V_{12}$ which are supplied to each of the multipliers 53, 58, 61, 66, 69 and 74. The operator's console 85 also includes a torque meter display in the form of three galvanometer-type meters which are responsive to the outputs of multipliers 58, 66 and 74, respectively.

It will be appreciated that FIGS. 8 and 9 have been separated for convenience of illustration only since the translation and rotation servo systems are substantially independent. However, in the actual embodiment of the invention, the operator's console 77 and 85 are unitary structures and may provide in addition to the force meter display 84 and torque meter display 92, a closed circuit television monitor where direct viewing of the manipulator arm is not possible. With respect to the transformation T matrix 82 and the "hawk" mode matrix 89, those skilled in the art will recognize that these matrices are readily implemented from the equations given hereinabove. A review of these equations will show that not only is a position sensor required at the gimbal 15 as previously mentioned, position sensors are also required at gimbals 14, 19 and 20 to implement the equations. More specifically, the transformation T matrix 82 receives as inputs, not only the outputs of the translational controller 79, but also outputs from the position sensors at gimbals 15, 19 and 20. The sine and cosine functions requires by the transformational T matrix are readily obtained through the use of resolvers as is well known in the art. On the other hand, the "hawk" mode control matrix 89 requires as inputs the outputs of position sensors at gimbals 14, 15, 19 and 20 and also the outputs of the rate sensors at gimbals 13, 14 and 15. Again, the trigonometric functions required by the "hawk" mode command matrix are readily implemented using resolvers and dividers as is well known in the art.

Having described the invention in terms of a preferred embodiment, it will be appreciated by those skilled in the art that the invention can be practiced by other and different embodiments within the scope of the appended claims.

What is claimed is:

1. In a manipulator system of the type having a master control console and a slave manipulator arm controlled by signals from said master control console, said master control console including a translation controller and a rotation controller, and said slave manipulator arm including pivoted arm segments moved by translational servo means in response to signals generated by said translation controller and pivoted wrist units moved by rotational servo means in response to signals generated by said rotation controller, the improvement wherein the signals generated by each of said translation controller and said rotation controller are rate command signals, said translational servo means includes rate sensor means for generating signals proportional to pivot rates of said pivoted arm segments and force computer means responsive to the rate command signals from said translation controller and the signals proportional to pivot rates of said pivoted arm segments for computing translation forces, said rotational servo means includes sensor means for generating signals proportional to pivot rates of said pivoted wrist units and torque computer means responsive to the rate command signals from said rotation controller and the signals proportional to pivot rates of said pivoted wrist units for computing rotation torques, and display means on said master control console responsive to said force computer means and said torque computer means for displaying translation forces and rotation torques.

2. The improvement in a manipulator system as recited in claim 1 wherein said pivoted arm segments comprise three pivots providing three degrees of freedom of movement and sid pivoted wrist units comprise three pivots providing three degrees of freedom of movement.

3. The improvement in a manipulator system as recited in claim 2 wherein said rate command signals from said translation controller represent range, azimuth and elevation rate commands and the rate command signals from said rotation controller represent pitch, yaw and roll rate commands, said translational servo means further includes position sensor means for generating signals proportional to pivot positions of said pivoted arm segments, and said rotational servo means further includes position sensor means for generating signals proportional to pivot positions of said pivoted wrist units, further comprising transformation means responsive to the signals generated by said position sensor means in each of said translational servo means and said rotational servo means and to the signals generated by said rate sensor means in said translational servo means and connected to each of said force computer means and said torque computer means for providing control of the terminal end of said slave manipulator arm in cartesian space.

4. The improvement in a manipulator system as recited in claim 1 wherein said pivoted arm segments comprise two segments and three providing three degrees of freedom of movement, said three pivots being defined as shoulder pitch, shoulder yaw and elbow pitch, and said rate command signals from said translation controller represent range, azimuth and elevation rate commands, said translational servo means including a shoulder pitch rate sensor, shoulder yaw rate sensor and an elbow pitch rate sensor and comprising an elbow pitch servo responsive to said range rate command and said elbow pitch rate sensor for generating an elbow pitch torque, a shoulder yaw servo responsive to said azimuth rate command and said shoulder yaw rate sensor for generating a shoulder yaw torque, and a shoulder pitch servo responsive to said elevation rate sensor and said elbow pitch rate sensor for generating a shoulder pitch torque.

5. The improvement in a manipulator system as recited in claim 1 wherein said pivoted wrist units comprise three pivots providing three degrees of freedom of movement, said three pivots being defined as wrist pitch, wrist yaw and wrist roll and said rate command signals from said rotation controller represent wrist pitch, wrist yaw and wrist roll rate commands, said rotational servo means including a wrist pitch rate sensor, a wrist yaw rate sensor and a wrist roll rate sensor and comprising a wrist pitch servo responsive to said wrist pitch rate command and said wrist pitch rate sensor for generating a wrist pitch torque, a wrist yaw servo responsive to said wrist yaw rate command and said wrist yaw rate sensor for generating a wrist yaw torque, and a wrist roll rate servo responsive to said wrist roll rate command and said wrist roll rate sensor for generating a wrist roll torque.

6. The improvement in a manipulator system as recited in claim 1 wherein said pivoted arm segments comprise two segments and three pivots providing three degrees of freedom of movement, said three pivots being defined as shoulder pitch, shoulder yaw and elbow pitch, and said rate command signals from said translation controller represent range, azimuth and elevation rate commands, said translational servo means including a shoulder pitch rate sensor, a shoulder yaw rate sensor and an elbow pitch rate sensor and comprising an elbow pitch servo responsive to said range rate command and said elbow pitch rate sensor for generating an elbow pitch torque, a shoulder yaw servo responsive to said azimuth rate command and said shoulder yaw rate sensor for generating a shoulder yaw torque, and a shoulder pitch servo responsive to said elevation rate command, said shoulder pitch rate sensor and said elbow pitch rate sensor for generating a shoulder pitch torque, and wherein said pivoted wrist units comprise three pivots providing three degrees of freedom of movement, said three pivots being defined as wrist pitch, wrist yaw and wrist roll and said rate command signals from said rotation controller represent wrist pitch, wrist yaw and wrist roll rate commands, said rotational servo means including a wrist pitch rate sensor, a wrist yaw rate sensor and a wrist roll rate sensor and comprising a wrist pitch servo responsive to said wrist pitch rate command and said wrist pitch rate sensor for generating a wrist pitch torque, a wrist yaw servo responsive to said wrist yaw rate commands and said wrist yaw rate sensor for generating a wrist yaw torque, and a wrist roll rate servo responsive to said wrist roll rate command and said wrist roll rate sensor for generating a wrist roll torque.

7. The improvement in a manipulator system as recited in claim 6 wherein said display means comprises first, second and third force meters connected to said elbow pitch servo, shoulder yaw servo and shoulder pitch servo, respectively, to display range, azimuth and elevation computed forces, respectively, and first, second and third torque meters connected to said wrist pitch servo, wrist yaw servo and wrist roll servo, respectively, to display wrist pitch, wrist yaw and wrist roll computed torques, respectively.

* * * * *